United States Patent
Sevindik

(10) Patent No.: US 9,814,044 B1
(45) Date of Patent: Nov. 7, 2017

(54) ALLOCATION OF CARRIERS BETWEEN BASE STATIONS WITH OVERLAPPING COVERAGE BASED ON A COMPARISON OF THEIR RESPECTIVE BACKHAUL CAPACITIES

(71) Applicant: Sprint Spectrum L.P., Overland Park, KS (US)

(72) Inventor: Volkan Sevindik, Fairfax, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 152 days.

(21) Appl. No.: 14/622,345

(22) Filed: Feb. 13, 2015

(51) Int. Cl.
  *H04W 72/04* (2009.01)

(52) U.S. Cl.
  CPC .............. *H04W 72/0453* (2013.01)

(58) Field of Classification Search
  None
  See application file for complete search history.

(56) References Cited

U.S. PATENT DOCUMENTS

| | | | |
|---|---|---|---|
| 8,363,564 B1* | 1/2013 | Talley | H04W 52/267 370/252 |
| 2010/0214977 A1 | 8/2010 | Hedge | |
| 2012/0231806 A1* | 9/2012 | Maric | H04W 28/22 455/452.2 |
| 2013/0070664 A1* | 3/2013 | Nagata | H04B 7/15542 370/315 |
| 2015/0117328 A1* | 4/2015 | Llairo | H04W 28/08 370/329 |

* cited by examiner

*Primary Examiner* — Christine Duong

(57) ABSTRACT

A controller may use allocate a set of carriers between two or more base stations based on the respective backhaul capacities of the base stations. An example method involves determining a first backhaul capacity of a first base station, determining a second backhaul capacity of a second base station, and allocating carriers of a set of carriers between the first base station and the second base station based at least one a comparison between the determined first backhaul capacity and the determined second backhaul capacity.

20 Claims, 5 Drawing Sheets

ALLOCATION OF CARRIERS BETWEEN BASE STATIONS WITH OVERLAPPING COVERAGE BASED ON A COMPARISON OF THEIR RESPECTIVE BACKHAUL CAPACITIES

BACKGROUND

Unless otherwise indicated herein, the description provided in this section is not itself prior art to the claims and is not admitted to be prior art by inclusion in this section.

In a wireless communication system, a base station may provide one or more directional or omnidirectional coverage areas in which the base station may serve user equipment devices (UEs), such as cell phones, wirelessly-equipped personal computers or tablets, tracking devices, embedded wireless communication modules, or other devices equipped with wireless communication functionality. In general, each coverage area may operate on one or more carriers each defining a respective bandwidth of coverage, and each coverage area may define an air interface providing a downlink for carrying communications from the base station to UEs and an uplink for carrying communications from UEs to the base station. The downlink and uplink may operate on separate carriers or may be time division multiplexed over the same carrier(s). Further, the air interface may define various channels for carrying communications between the base station and the UEs. For instance, the air interface may define one or more downlink traffic channels and downlink control channels, and one or more uplink traffic channels and uplink control channels.

In accordance with the Long Term Evolution (LTE) standard of the Universal Mobile Telecommunications System (UMTS), for instance, each coverage area of a base station may operate on one or more carriers spanning 1.4 MHz, 3 MHz, 5 MHz, 10 MHz, 15 MHz, or 20 MHz, with each carrier in a coverage area defining a respective "cell". On each such carrier used for downlink communications, the air interface then defines a Physical Downlink Shared Channel (PDSCH) as a primary channel for carrying data from the base station to UEs, and a Physical Downlink Control Channel (PDCCH) for carrying control signaling from the base station to UEs. Further, on each such carrier used for uplink communications, the air interface defines a Physical Uplink Shared Channel (PUSCH) as a primary channel for carrying data from UEs to the base station, and a Physical Uplink Control Channel (PUCCH) for carrying control signaling from UEs to the base station.

A recent revision of LTE known as LTE-Advanced now permits a base station to serve a UE with "carrier aggregation," by which the base station schedules bearer communication with the UE on multiple carriers at a time. With carrier aggregation, multiple carriers from either contiguous frequency bands or non-contiguous frequency bands can be aggregated to increase the bandwidth available to the UE. Currently, the maximum bandwidth for a data transaction between a base station and a UE using a single carrier is 20 MHz. Using carrier aggregation, a base station may increase the maximum bandwidth to up to 100 MHz by aggregating up to five carriers. Each aggregated carrier is referred to as a "component carrier."

In practice, base stations may take various forms, such as, for instance, a "macro base station" or "macrocell" implemented in public spaces typically including a cell tower and tower top antenna structure, or a "small cell" that typically has a smaller form factor and is designed to provide smaller coverage. Small cells are low-powered radio access base stations that address gaps in coverage, offload mobile data traffic from other large scale base stations, or both. As a result of growth in mobile data traffic, many service providers strategically provide small cells throughout their coverage areas or offer small cells directly to consumers for use in a home or office. Examples of small cells include femtocells, picocells, and microcells. In general, small cells are smaller in size, weight, and output-power than macro base stations.

Further, each base station in a wireless communication system may be coupled with network infrastructure that provides connectivity with one or more transport networks, such as the public switched telephone network (PSTN) and/or the Internet for instance. In an example arrangement, the network infrastructure may include one or more packet data network gateways (PGWs) or similar components that provide connectivity with a packet-switched network so as to support various communication services.

The connection between a base station and other radio access network (RAN) components (e.g., PGWs) situated further towards the network core is commonly referred to as a "backhaul" and may take various forms. For many typical configurations involving macro-type base stations, the backhaul may comprise one or more high-capacity telecommunication trunks, such as T1, millimeter wave, or microwave wave links. Likewise, the backhaul for some small cells may also comprise a T1, millimeter wave, or microwave link. However, for some small cells, the backhaul may take a different form. For instance, some small cells may connect to a service provider's network by way of a residential or commercial broadband connection (e.g., cable line, fiber optic line, Digital Subscriber line (DSL), or the like).

Overview

The data rate achievable between a UE and a transport network, such as the PSTN or the Internet, depends, at least in part, on both: (i) a capacity of an RF link between the UE and a base station that is serving the UE as well as (ii) a capacity of the base station's backhaul. In some instances, the capacity of the RF link may represent a limiting factor in the maximum achievable data rate between the UE and the transport network. For example, the base station may be a macro-type base station having a high-capacity backhaul that supports transfer of data at rates generally exceeding the maximum rates achievable on the RF link, such that the maximum data rate on the RF link limits the maximum achievable data rate between the UE and the transport network.

It may not always be the case, however, that the backhaul supports data rates exceeding those achievable on the RF link. For example, the base station may be a femtocell having a residential broadband-based backhaul that supports transfer of data at rates generally below the maximum rates available on the RF link. As another example, if a base station is configured to engage in carrier aggregation, the maximum rates available on the RF link may exceed the capacity of the base station's backhaul when the base station aggregates multiple carriers. In these circumstances, the backhaul, and not the RF link, may represent the predominant limitation to achievable rates.

Moreover, in a scenario where a first base station is positioned within coverage of a second base station (or more generally where a first base station and a second base station provide overlapping coverage), the first base station and the second base station may share the available spectrum for the area. For instance, there may be a limited number of carriers available for the two base stations to provide service on in the area. In order to reduce interference issues, the first base station may be configured to provide service on a different carrier(s) than the second base station. As an example, the first base station may operate on a first carrier and the second base station may operate on a second carrier. Or as another example, either the first base station or the second base station may operate on multiple carriers that may be aggregated to serve UEs with carrier aggregation, and the other one of the two base stations may operate on a different carrier(s).

In some situations, the first base station may have a first backhaul capacity that is greater than a second backhaul capacity of the second base station. Additionally, there may be two carriers available to provide service on in the area, and a first one of the carriers may be larger than a second one of the carriers. For instance, the first carrier may span 5 MHz and the second carrier may span 10 MHz. And further, the first backhaul capacity of the first base station may support transfer of data at rates generally exceeding a maximum achievable data rate on the 10-MHz carrier, while the second backhaul capacity may support transfer of data at rates generally below the maximum achievable data rate on the 10-MHz carrier but exceeding a maximum achievable data rate on the 5-MHz carrier. In such a situation, it would be desirable to allow the first base station to use the 10-MHz carrier rather than the 5-MHz carrier, to take advantage of the first base station's larger backhaul capacity, and to have the second base station use the 5-MHz carrier.

Similarly, in line with the discussion above, in some situations, when one of the two base stations engages in carrier aggregation, the maximum data rate available on the RF link provided by the base station may exceed the capacity of the base station's backhaul. For instance, when the first base station aggregates only two carriers, the capacity on the RF link may be less than the capacity of the first base station's backhaul, but when the first base station aggregates more than two carriers, the capacity on the RF link may exceed the capacity of the first base station's backhaul. And further, the backhaul capacity of the second base station may be greater than that of the first base station such that the second base station could support aggregating more carriers than the first base station. In such a situation, it would be desirable to allow the second base station to use the carrier(s) that the first base station cannot fully make use of because of the backhaul limitation.

Hence, disclosed herein are methods and corresponding systems to help allocate carriers between two or more base stations in a manner that allows the base stations to share available spectrum and efficiently use their available backhaul resources. In accordance with this disclosure, a first base station (or another component in a RAN) may determine respective backhaul capacities of the first base station and a second base station that provides overlapping coverage with the first base station. And the first base station may then use a comparison of the respective backhaul capacities as a basis to allocate carriers between the first base station and the second base station.

By way of example, in one implementation, a first base station (e.g., a macrocell) may receive a backhaul capacity report from another base station (e.g., a small cell) that provides overlapping coverage with the first base station. For instance, the first base station may receive a report indicating a statistical measure of possible data rate for communication between the other base station and a backhaul network entity. The first base station may then compare the backhaul capacity reported by the other base station with its own backhaul capacity, and establish an allocation of carriers of a set of carriers between the first base station and the other base station based at least on the comparison of their respective backhaul capacities.

For instance, if the first base station has twice the backhaul capacity of the second base station, twice as many carriers could be allocated to the first base station as to the second base station—assuming the carriers are largely the same capacity as each other. Or in another instance, if the set of carriers only includes two carriers, and the two carriers have different sizes, the larger carrier of the two carriers could be allocated to the base station having the largest backhaul capacity and the smaller carrier of the two carriers could be allocated to the base station having the smallest backhaul capacity. After establishing the allocation, the base station may then provide to the other base station instructions for operating on one or more particular carriers of the set of carriers in accordance with the established allocation.

As described herein, a base station may determine its backhaul capacity in a number of ways. In some instances, the base station may determine its backhaul capacity using user data that is communicated to or from one or more UEs that the base station is serving. For instance, the base station may receive data from a UE, transfer the received data to a backhaul network entity, and measure a data transfer rate for the communication between the base station and the backhaul network entity. In other instances, the base station may determine its backhaul capacity by performing a data-rate test with a backhaul network entity. For example, the base station may send multiple test data packets to the backhaul network entity, and measure a data transfer rate for each test packet. The base station may then identify the maximum data rate from the data-rate test, and use the maximum data rate as the backhaul capacity.

Further, in some instances, a first base station and a group of base stations, such as a group of small cells, may provide overlapping coverage. In such a scenario, one of the base stations of the group of base stations may be configured as a master base station, while the remaining base stations of the group of base stations may be configured as slave base stations that report their respective backhaul capacity to the master base station. With this configuration, the master base station may then determine a representative per-base station backhaul capacity and report the representative per-base station backhaul capacity to the first base station (or another network entity) for use in establishing the allocation of carriers.

Accordingly, in one respect, disclosed is a method operable in a radio access network (RAN) having a first base station and at least one second base station. The first base station and the at least one second base station may provide overlapping coverage. The method involves determining a first backhaul capacity of the first base station. Further, the method involves determining a second backhaul capacity of the at least one second base station. And the method involves allocating, using at least one processing unit, carriers of a set of carriers between the first base station and the at least one second base station based at least on a comparison between the determined first backhaul capacity and the determined second backhaul capacity.

In another respect, disclosed is a base station that may include an antenna structure that radiates to define a coverage area for serving UEs, and may further include a network communication interface through which the base station is configured to receive backhaul capacity reports from another base station. The base station and the other base station may provide overlapping coverage. Additionally, the base station may include a controller arranged to allocate carriers of a set of carriers between the base station and the other base station. The controller may include at least one processing unit, data storage, and program instructions stored in the data storage and executable by the at least one processing unit to carry out various functions. In an example implementation, the functions may include: (a) determining a backhaul capacity of the base station, (b) establishing an allocation of the carriers of the set of carriers between the base station and the other base station based at least on a comparison between the determined backhaul capacity and a backhaul capacity reported by the other base station, (c) causing the base station to operate on one or more particular carriers of the set of carriers in accordance with the established allocation of carriers of the set of carriers, and (d) providing to the other base station instructions for operating on one or more other carriers of the set of carriers in accordance with the established allocation of the carriers of the set of carriers.

Further, in another respect, disclosed is a non-transitory computer-readable medium having stored thereon instructions executable by at least one processing unit to carry out various functions. The functions involve determining a first backhaul capacity of a first base station, and involve determining a second backhaul capacity of at least one second base station. The first base station and the at least one second base station may provide overlapping coverage. And the functions involve allocating carriers of a set of carriers between the first base station and the at least one second base station based at least on a comparison between the determined first backhaul capacity and the determined second backhaul capacity.

These as well as other aspects, advantages, and alternatives will become apparent to those of ordinary skill in the art by reading the following detailed description, with reference where appropriate to the accompanying drawings. Further, it should be understood that the descriptions provided in this overview and below are intended to illustrate the invention by way of example only and not by way of limitation.

DETAILED DESCRIPTION

The present method and apparatus will be described herein in the context of LTE. However, it will be understood that principles of the disclosure can extend to apply in other scenarios as well, such as with respect to other air interface protocols. Further, even within the context of LTE, numerous variations from the details disclosed herein may be possible. For instance, elements, arrangements, and functions may be added, removed, combined, distributed, or otherwise modified. In addition, it will be understood that functions described here as being performed by one or more entities may be implemented in various ways, such as by a processor executing software instructions for instance.

Figure 1:
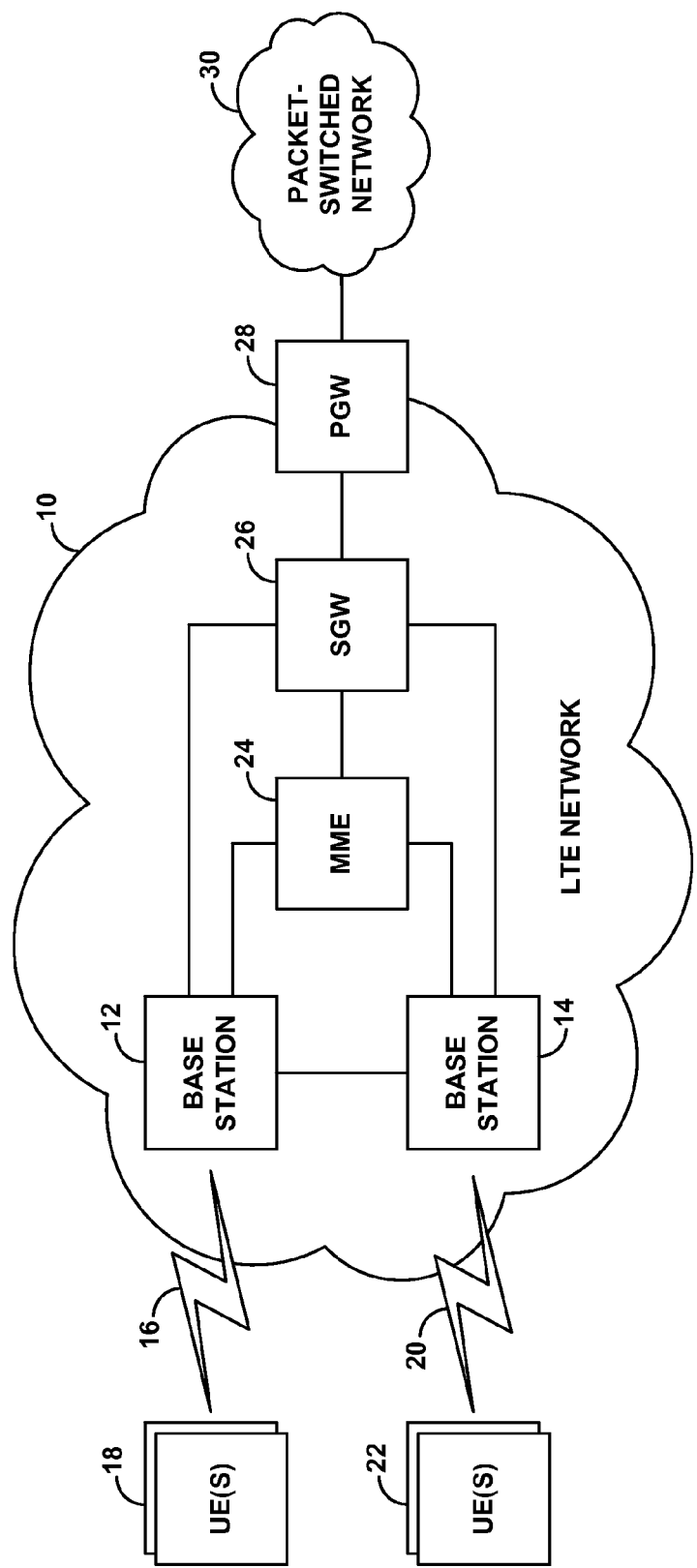
FIG. 1 is a simplified block diagram of an example wireless communication system in which features of the present disclosure can be implemented.

Referring to the drawings, as noted above, FIG. 1 is a simplified block diagram of an example wireless communication system in which features of the present disclosure can be implemented. In particular, FIG. 1 depicts a representative LTE network 10, which functions primarily to serve UEs with wireless packet data communication service, including possibly voice-over-packet service, but may also provide other functions. As shown, the LTE network includes two representative LTE base stations (evolved Node-Bs (eNodeBs) 12, 14, each of which would have an antenna structure and associated equipment for providing a respective LTE air interface through which to serve UEs. By way of example, eNodeB 12 is shown providing air interface 16 through which to serve one or more UEs 18, and eNodeB 14 is shown providing air interface 20 through which to serve one or more UEs 22. The UEs may take various forms, such as any of those noted above, whether or not operated by a human "user."

In practice, these base stations may provide overlapping coverage. For instance, the base stations' respective coverage areas could overlap with each other in whole or in part, as may be established by one or more UEs served by one of the base stations reporting to the serving base station that the UE(s) are detecting signals from the other base station. Physically, the base stations can be co-located or distributed at some distance from each other.

Further, the base stations themselves can take various forms. By way of example, either or each base station could be a macro base station of the type typically provided by a wireless service provider with a tower mounted antenna structure and associated equipment. Or either or each base station could be a small cell base station (such as a femtocell, picocell, or the like) typically provided to help improve coverage within macro cell coverage and usually having a much smaller form factor and coverage range than a macro base station. As a specific example, base station 12 could be a macro base station, and base station 14 could be a small cell base station positioned at least partially within coverage of the macro base station. Thus, the two base stations would provide overlapping coverage.

As further shown in the example arrangement of FIG. 1, the base stations have a communication interface (e.g., an LTE "X2" interface) with each other, and each base station has a communication interface with a mobility management entity (MME) 24 that functions as a signaling controller for the LTE network and may also facilitate communication between the base stations. Further, each base station then has a communication interface with a serving gateway (SGW) 26, which in turn has a communication interface with a PGW 28 that provides connectivity with a packet-switched network 30, and the MME 24 has a communication interface with the SGW 26. In practice, the illustrated components of the LTE network may sit as nodes on a private packet-switched network owned by an operator of the LTE network, and thus the various communication interfaces may be logical interfaces through that network.

In the example arrangement, each base station's coverage area defines air interface resources that are mapped in the time domain and in the frequency domain. More specifically, in accordance with LTE, the air interface on both the downlink and the uplink spans a particular frequency bandwidth (such as 1.4 MHz, 3 MHz, 5 MHz, 10 MHz, 15 MHz, or 20 MHz) that is divided primarily into subcarriers spaced apart from each other by 15 kHz. Further, the air interface is divided over time into a continuum of 10-millisecond (ms) frames, with each frame being further divided into 1 ms sub-frames and 0.5 ms slots. With this arrangement, each sub-frame is considered to be a transmission time interval (TTI). Thus, each frame has ten TTIs, and each TTI has 2 slots. In the frequency domain, resources are divided into groups of 12 sub-carriers. Each sub-carrier is 15 kHz wide, so each group of 12 sub-carriers occupies a 180 kHz bandwidth.

LTE further defines a particular grouping of time-domain and frequency-domain resources as a "resource block". In the time domain, each resource block has a duration corresponding to one sub-frame (1 ms) or one slot (0.5 ms). In the frequency domain, each resource block consists of a group of 12 sub-carriers that are used together to form symbols, such as OFDM symbols on the downlink and frequency-division multiple access (FDMA) symbols on the uplink. In addition, each resource block is divided over time into symbol segments of 67 microseconds each, with each symbol segment spanning the 12 sub-carriers of the resource block and thus supporting transmission of symbols in "resource elements."

As discussed above, the LTE air interface then defines various channels made up of certain ones of these resource blocks and resource elements. For instance, on the downlink, certain resource elements across the bandwidth are reserved to define a PDCCH for carrying control signaling from the eNodeBs to UEs, and other resource elements are reserved to define a PDSCH for carrying bearer data transmissions from the eNodeBs to UEs. Likewise, on the uplink certain resource elements across the bandwidth are reserved to define a PUCCH for carrying control signaling from UEs to the eNodeBs, and other resource elements are reserved to define a PUSCH for carrying bearer data transmission from UEs to the eNodeB.

In practice, the maximum achievable data rate on a particular carrier may depend on a bandwidth of the carrier. By way of example, the maximum achievable data rate on a downlink carrier may depend on a bandwidth of the downlink carrier. Generally, a larger carrier may support transmission of a greater number of resource blocks per TTI, and thus support a higher data rate, than a smaller carrier. For instance, a 5 MHz carrier may support 25 resource blocks in each TTI, whereas a 15 MHz carrier may support 75 resource blocks in each TTI.

Furthermore, in the example arrangement of FIG. 1, either or each of the base stations may serve one or more UEs with carrier-aggregation service on a plurality of component carriers, meaning that a base station serves at least one UE concurrently on multiple component carriers. Each of these component carriers may have a respective bandwidth (such as 5 MHz or another carrier bandwidth as discussed above).

As discussed above, in some instances, a first base station and a group of base stations, such as a group of small cells, may provide overlapping coverage. In such a scenario, one of the base stations of the group of base stations may be configured as a master base station, while the remaining base stations of the group of base stations may be configured as slave base stations. By way of example, FIG. 2 is an illustration of an example wireless communication system in which this may occur.

Figure 2:
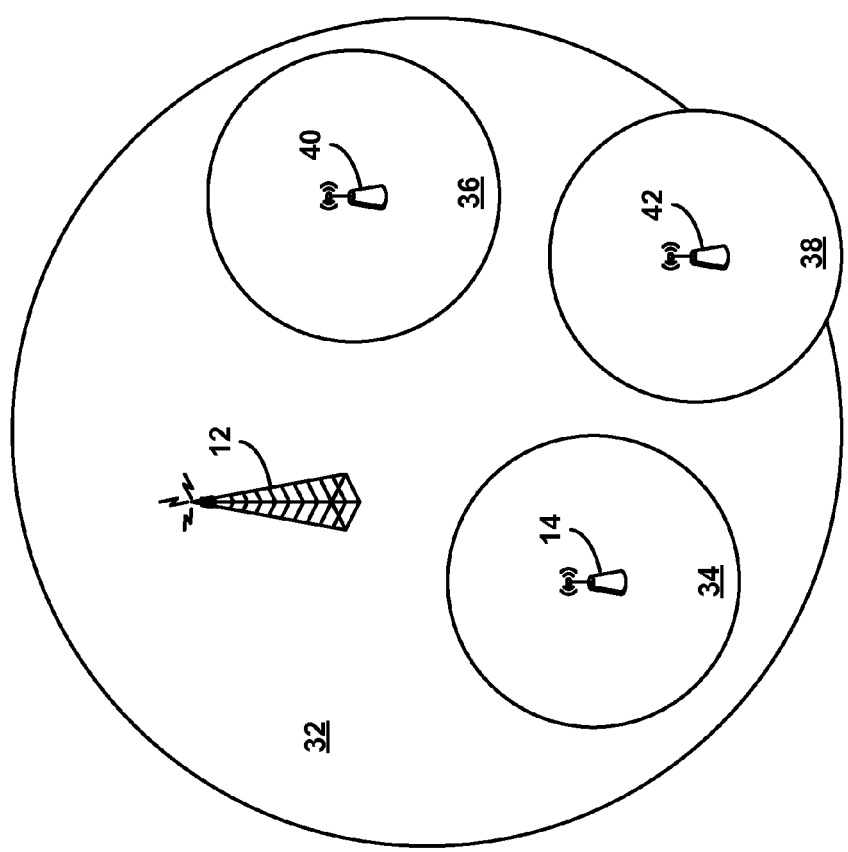
FIG. 2 is an illustration of an example wireless communication system in which features of the present disclosure can be implemented.

FIG. 2 depicts the example wireless communication system as including a coverage area 32 provided by base station 12, and depicts a coverage area 34 provided by base station 14. Further, FIG. 2 depicts two additional coverage areas 36, 38 provided by two additional base stations 40, 42 respectively. Note that each of the base stations 14, 40, 42 provides coverage that overlaps with the coverage provided by base station 12.

In one example, the base station 12 may be a macrocell, while each of the base stations 14, 40, 42 may be small cells. Further, one of the small cells, such as base station 14, may be configured as a master base station, and the base stations 40, 42 may be configured as slave base stations. With this configuration, in line with the discussion above, base stations 40, 42 may communicate with base station 14. For instance, each of base stations 14, 40, and 42 may be communicatively linked via a wired interface (e.g., X2 interface) and/or wireless interface, such that base stations 14, 40, 42 may communicate data with one another.

As discussed above, in a scenario where one or more base stations provide overlapping coverage, such as the scenario depicted in FIG. 2, the base stations may share the available spectrum for the area. For instance, there may be a limited number of carriers available, and a first base station may be configured to provide service on a different carrier(s) than a second base station in order to reduce interference issues. As an example, the first base station may operate on a first carrier and the second base station may operate on a second carrier. Or as another example, either the first base station or the second base station may operate on multiple carriers that may be aggregated to serve UEs with carrier aggregation, and the other one of the two base stations may operate on a different carrier(s).

Further, as discussed above, in a scenario where there are two differently sized carriers available to provide service on in the area, it may be desirable to allow a first base station, having a larger backhaul capacity than a second base station, to use a larger carrier of the two carriers, and to have the second base station use the smaller carrier of the two carriers. For instance, a first carrier may span 5 MHz and a second carrier may span 10 MHz. And further, the backhaul capacity of the first base station may support transfer of data at rates generally exceeding a maximum achievable data rate on the 10-MHz carrier, while a backhaul capacity of the second base station may support transfer of data at rates generally below the maximum achievable data rate on the 10-MHz carrier but exceeding a maximum achievable data rate on the 5-MHz carrier. Thus, it would be desirable to allow the first base station to use the 10-MHz carrier rather than the 5-MHz carrier, to take advantage of the first base station's larger backhaul capacity, and to have the second base station use the 5-MHz carrier.

Likewise, in some scenarios, it may be desirable to allocate more carriers to one base station than to another base station, such as when a first base station has a smaller backhaul capacity than the second base station. For instance, when the first base station carrier-aggregates two or more carriers, the capacity on the RF link may exceed the capacity of the first base station's backhaul. And further, the backhaul capacity of the second base station may be greater than that of the first base station such that the second base station could support aggregating two or more carriers without exceeding a capacity of the second base station's backhaul. Thus, it would be desirable to allocate a single carrier to the first base station and allocate multiple carriers to the second base station, to allow the second base station to use the carrier(s) that the first base station cannot fully make use of because of the backhaul limitation.

In accordance with the present disclosure, as noted above, a first base station (or another component in a RAN) may determine respective backhaul capacities of the first base station and a second base station that provides overlapping coverage with the first base station (or a group of second base stations that provide overlapping coverage with the first base station). And the first base station may then use a comparison of the respective backhaul capacities as a basis to allocate carriers between the first base station and the second base station.

As discussed above, a base station's backhaul capacity may be a statistical measure of possible data rate for communication with a backhaul network entity. As such, a backhaul capacity may include, for example, a maximum data transfer rate for downlink and/or uplink communication via the base station's backhaul.

In one example scenario, each of the first base station and the second base station may determine their respective backhaul capacities, and then the second base station may send to the first base station a message or report that indicates the base station's backhaul capacity, such that a controller of the first base station may use a comparison of the determined backhaul capacities as a basis to allocate carriers between the first base station and the second base station. Alternatively, in another example scenario, each of the base stations may determine their respective backhaul capacities, and then send a message or report to another network entity, such as an MME, such that a controller of the MME may use a comparison of the determined backhaul capacities as a basis to allocate carriers between the first base station and the second base station.

In practice, a base station may determine its backhaul capacity in a number of ways. By way of example, a base station may determine its backhaul capacity using data that is communicated to or from one or more UEs that the base station is serving. For instance, the base station may receive bearer data from a UE, and in turn signal to a backhaul network entity to invoke measurement of a data transfer rate. As an example, the base station may signal to an PGW to request a measurement of the data transfer rate, and then transfer the received bearer data to the PGW. In turn, the PGW may be arranged to measure a data transfer rate for the communication of the bearer data, and signal back to the base station to provide an indication of the measured data transfer rate. The base station may then use the indicated data transfer rate as an estimate of its backhaul capacity.

Alternatively, a base station may determine its backhaul capacity by invoking a data-rate test with a remotely-located test server via the backhaul connection. For example, the test server could be part of the service provider's network, or could be a third-party server known by the service provider to be trustworthy and/or secure, and the base station could communicate data packets with the test server to support measurement of achievable data rates on the base station's backhaul. In one instance, the base station may send to the test server or receive from the test server multiple test data packets of varying size, and the test server may determine a maximum backhaul data rate between the base station and the test server. Subsequently, the test server may report the maximum data rate to the base station, and the base station may use the reported data rate as an estimate of its backhaul capacity.

Accordingly, in line with the discussion above, in one example embodiment, a first base station may determine its backhaul capacity, and receive from a second base station a report indicating the second base station's backhaul capacity. Further, the first base station may then use a comparison of its backhaul capacity and the second base station's backhaul capacity as a basis to allocate carriers of a set of carriers between the first base station and the second base station.

In one situation, the set of carriers may include two differently sized carriers: a smaller carrier and a larger carrier. Further, the first base station may have a larger backhaul capacity than the second base station. In this situation, the first base station may allocate the two carriers between the first base station and the second base station by operating on the larger carrier and sending a message to the second base station that instructs the second base station to operate on the smaller carrier. In practice, the first base station may then broadcast to the UEs in its coverage area a carrier list that identifies the larger carrier, and the second base station may broadcast to the UEs in its coverage area a carrier list that identifies the smaller carrier.

Similarly, in another situation, the set of carriers may include three carriers. For ease of explanation, assume the three carriers are of equal size. Further, the first base station may have a larger backhaul capacity than the second base station. In this situation, the first base station may allocate two of the three carriers to the first base station by operating on the two carriers, and allocate the last carrier of the three carriers to the second base station by instructing the second base station to operate on the last carrier.

In still another situation, the first base station may determine a backhaul-capacity ratio between the first base station's backhaul capacity and the second base station's backhaul capacity, and use the backhaul-capacity ratio as a basis to establish an allocation of the carriers of the set of carriers between the first base station and the second base station. For instance, the first base station may establish an allocation such that a ratio of a number of carriers allocated to the first base station to a number of carriers allocated to the second base station is proportional to the backhaul-capacity ratio. In other words, if the backhaul capacity of the first base station is greater than the backhaul capacity of the second base station, the first base station may establish an allocation in which the number of carriers allocated to the first base station is greater than the number of carriers allocated to the second base station.

In some situations, the first base station may monitor its backhaul capacity over time, and in response to detecting a threshold extent of change in backhaul capacity, the first base station may establish an allocation of the set of carriers. For instance, the first base station may periodically determine its backhaul capacity, and compare the backhaul capacity to a most recently determined backhaul capacity. In response to detecting that a difference between the current backhaul capacity and the most recently determined backhaul capacity exceeds a threshold, the base station may responsively establish the allocation of the set of carriers. In this manner, the first base station may update the allocation of the set of carriers to account for changes in its backhaul capacity.

Similarly, in some situations, the second base station may monitor its backhaul capacity over time and provide a carrier-update message to the first base station in response to the second base station detecting a threshold extent of change in the second base station's backhaul capacity. And in turn, in response to the first base station receiving the carrier-update message from the second base station, the first base station may responsively establish the allocation of the set of carriers.

Further, as noted above, in another embodiment, a RAN component (e.g., an MME, SGW, or other component) that is separate from the first base station and the second base station may allocate a set of carriers between the first base station and the second base station. In this embodiment, each of the first base station and the second base station may report their respective backhaul capacity to the RAN component, and the RAN component may then compare the backhaul capacities and allocate carriers of the set of carriers between the first base station and the second base station based at least on the comparison.

In practice, the RAN component may establish an allocation of the carriers of the set of carriers based at least on the comparison between the backhaul capacities of the first base station and the second base station in a manner similar to any of the approaches discussed above as carried out by the first base station. In practice, the RAN component may then allocate the carriers of the set of carriers between the first base station and the second base station by providing a first message to the first base station that instructs the first base station operate on at least one particular carrier of the set of carriers and providing a second message to the second base station that instructs the second base station to operate on at least one other carrier of the set of carriers.

As one example, the set of carriers may include two carriers, and the RAN component may provide a first message to the first base station that instructs the first base station to operate on a first carrier and provide a second message to the second base station that instructs the second base station to operate on a second carrier. Or the set of carrier may include five carriers, and the RAN component may provide a first message to the first base station that instructs the first base station to operate on two of the carriers (e.g., a first one and a second one) and provide a second message to the second base station that instructs the second base station to operate on three other carriers (e.g., a third one, a fourth one, and a fifth one).

According to another embodiment, as discussed above, a first base station and multiple other base stations may provide overlapping coverage. For instance, the first base station may be a macrocell, and multiple small cells may each provide coverage that overlaps with the coverage provided by the first base station. Further, in line with the discussion above, one of the small cells may be configured as a master small cell, and the other small cells may be configured as slave small cells. With this arrangement, each of the slave small cells may determine their respective backhaul capacity, and then report their respective backhaul capacity to the master small cell. Additionally, the master small cell may determine a backhaul capacity of its own backhaul, and then determine a per-small cell backhaul capacity that is representative of the backhaul capacity of each of the small cells. As an example, the master small cell may determine an average backhaul capacity of the small cells.

Additionally, in one example, the master small cell may then provide the representative per-small cell backhaul capacity to the first base station, which may in turn establish an allocation of a set of carriers between the first base station and the multiple small cells. In practice, the first base station may treat the multiple small cells collectively as a single base station for purposes of allocating carriers, since the small cells may each be able to operate on a same carrier(s) without causing interference. After establishing the allocation of carriers, the first base station may provide instructions to the master small cell to operate on one or more particular carrier(s), and the master small cell may then relay the instructions to each of the slave small cells. Alternatively, the master small cell may provide the representative per-small cell backhaul capacity to another RAN component that is configured to establish the allocation of carriers, and receive instructions from the RAN component for operating one or more particular carrier(s).

In another example, the master small cell itself may establish the allocation of carriers. For instance, the master small cell may receive from the first base station a message specifying the backhaul capacity of the first base station. The master small cell may then compare the backhaul capacity of the first base station to the per-small cell representative backhaul capacity, establish an allocation of the carriers based on the comparison, and provide instructions to the first base station for operating on a particular carrier(s).

Moreover, in some instances, a first base station and a second base station that provide overlapping coverage in a particular area may each be configured to operate on a respective dedicated carrier. For instance, the first base station may be arranged to provide service on a first dedicated carrier, and the second base station may be arranged to provide service on a second dedicated carrier. Additionally, there may be a set of carriers available in the particular area that either or each of the first base station and the second base station may use for carrier-aggregation. By way of example, the set of carriers may include two carriers that are separate from the first dedicated carrier and the second dedicated carrier, and either or each of the first base station and the second base station may be capable of carrier-aggregating the two carriers with their respective dedicated carrier.

In this situation, the first base station (or another RAN component) may establish an allocation of the carrier-aggregation carriers based at least on a comparison of the respective backhaul capacity of the first base station and the second base station. For instance, the first base station may determine how many of the carrier-aggregation carriers to allocate to each of the first base station and the second base station based at least on a comparison of the respective backhaul capacity of the first base station and the second base station.

As one example, if the set of carriers include a larger carrier and a smaller carrier and the backhaul capacity of the first base station is larger than the backhaul capacity of the second base station, the first base station may allocate the larger carrier to the first base station for carrier-aggregating with the first base station's dedicated carrier, and allocate the smaller carrier to the second base station for carrier-aggregating with the second base station's dedicated carrier. Or, in some instances, the first base station might allocate both of the carriers of the set of carriers to the first base station and none of the carriers to the second base station. For example, this may occur if the second base station's backhaul capacity is less than the throughput needed to support carrier aggregation (i.e., if the second base station's backhaul capacity is less than the maximum data transfer rate achievable on the RF link when carrier-aggregating one of the carriers of the set of carriers with the second base station's dedicated carrier). Other examples are also contemplated in line with the other embodiments disclosed above.

Figure 3:
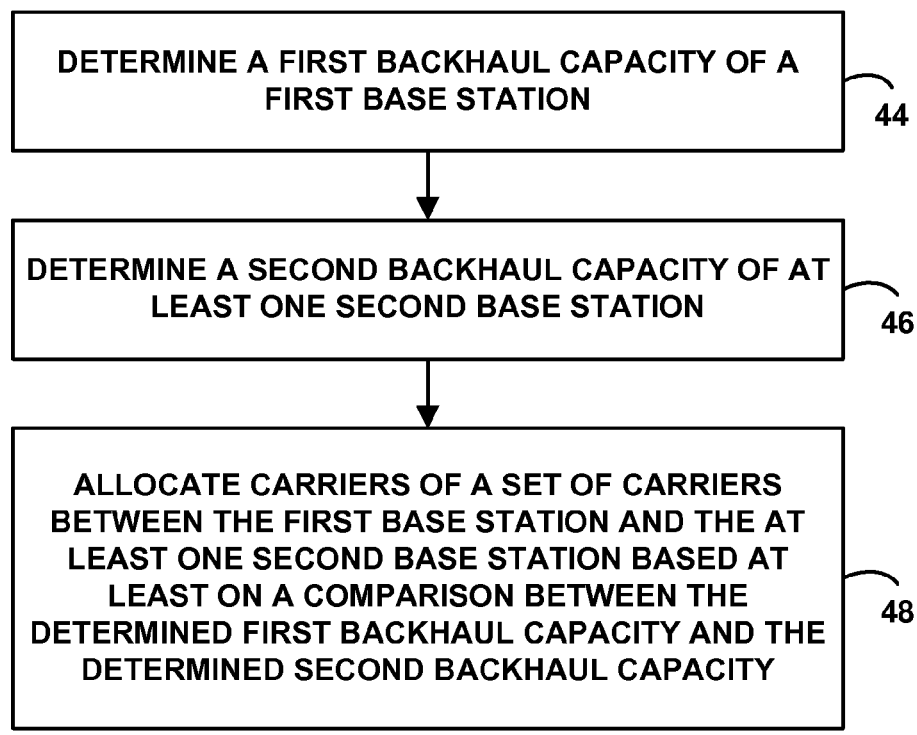
FIG. 3 is a flow chart depicting functions of a method that can be implemented in accordance with the disclosure.

FIG. 3 is a flow chart depicting some of these functions, as functions carried out by a controller, such as a controller of a base station or a controller of a RAN component (e.g., an MME, SGW, etc.). In line with the discussion above, these functions may be carried out in a RAN having a first base station and at least one second base station. Further, these functions may be carried out in a network arrangement in which the first base station and the at least one second base station may provide overlapping coverage. In some instances, the first base station may be a macrocell and the at least one second base station may be a small cell (e.g., a femtocell, picocell, microcell, etc.).

As shown in FIG. 3, at block 44, the controller determines a first backhaul capacity of the first base station. For instance, in line with the discussion above, the controller may determine the first backhaul capacity by measuring a data transfer rate using user bearer data or by sending test packets to a backhaul network entity (e.g., a test server).

At block 46, the controller determines a second backhaul capacity of at least one second base station. In line with the discussion above, the controller may receive a report from the at least one second base station specifying the second backhaul capacity.

And at block 48, the controller then allocates carriers of a set of carriers between the first base station and the at least one second base station based at least on a comparison between the determined first backhaul capacity and the determined second backhaul capacity. As discussed above, in one example, the controller may determine, based at least on the comparison, which of two carriers to allocate to the first base station and the at least one second base station. Or in an example in which the set of carriers includes more than two carriers, the controller may determine how many carriers to allocate to each of the first base station and the at least one second base station based at least on the comparison.

In embodiments in which the controller is a controller of the first base station, the controller may allocate the carriers of the set of carriers by causing the first base station to operate on a particular carrier(s), and providing instructions to the at least one second base station for operating on another carrier(s). And in embodiments in which the controller is a controller that is separate from the first base station and the at least one second base station, the controller may allocate the carriers of the set of carriers by providing a first message to the first base station that instructs the first base station to operate on at least one particular carrier and providing a second message to the at least one second base station that instructs the at least one second base station to operate on another carrier(s).

Figure 4:
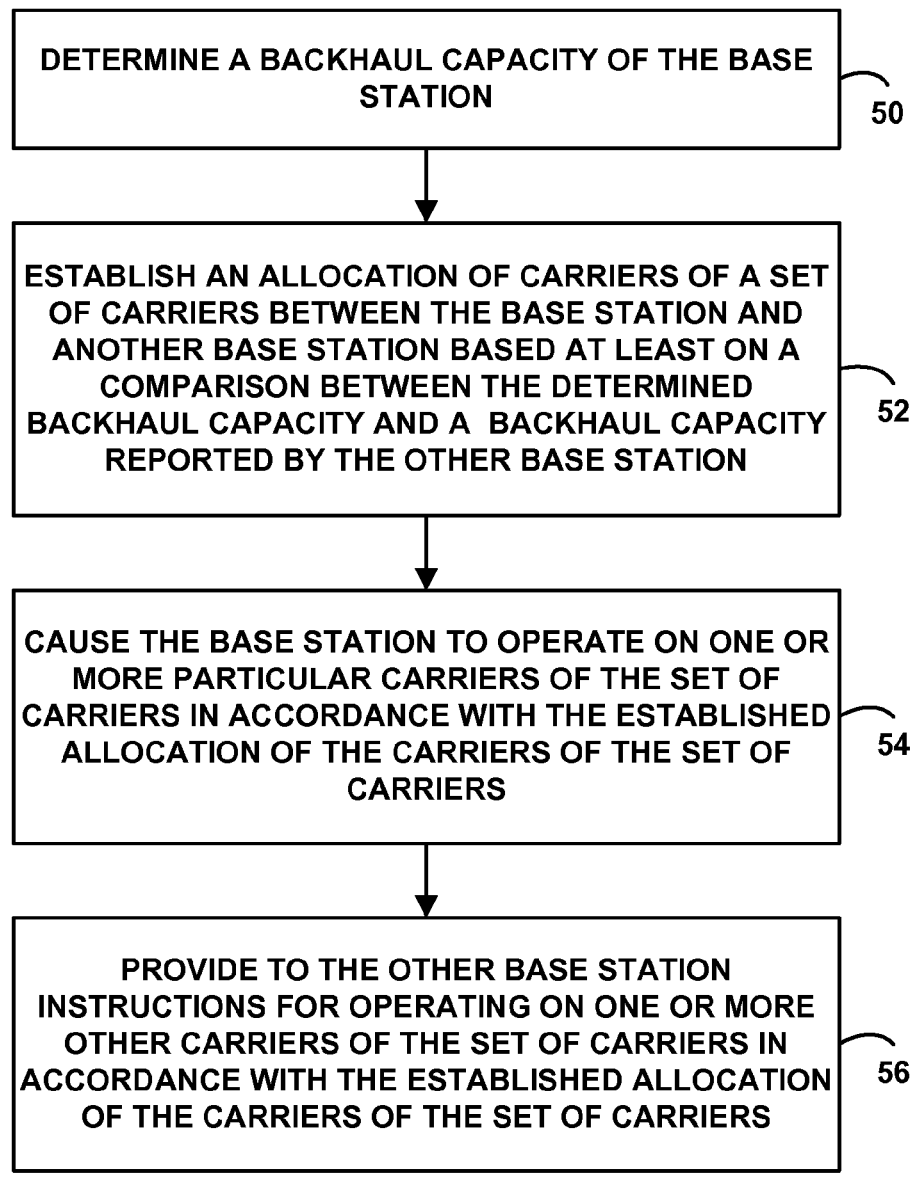
FIG. 4 is another flow chart depicting functions of a method that can be implemented in accordance with the disclosure.

FIG. 4 is next another flow chart depicting functions that can be carried out by a controller of a base station to allocate carriers of a set of carriers between the base station and another base station. In line with the discussion above, these functions may be carried out in a network arrangement in which the base station and the other base station provide overlapping coverage. For instance, the base station that carries out these functions may be a macrocell, and the other base station may be a small cell that provides overlapping coverage with the macrocell. Further, the base station that carries out these functions may have a network communication interface through which the base station is configured to receive backhaul capacity reports from the other base station.

As shown in FIG. 4, at block 50, the controller determines a backhaul capacity of the base station. At block 52, the controller then establishes an allocation of the carriers of the set of carriers between the base station and the other base station based at least on a comparison between the determined backhaul capacity and a backhaul capacity reported by the other base station. Further, at block 54, the controller causes the base station to operate on one or more particular carriers of the set of carriers in accordance with the established allocation of the carriers of the set of carriers. And at block 56, the controller provides to the other base station instructions for operating on one or more other carriers of the set of carriers in accordance with the established allocation of the carriers of the set of carriers.

As discussed above, in some examples, the controller may carry out one or more of these functions in response to the base station receiving a carrier-update message from the other base station. For instance, in response to the base station receiving a carrier-update message from the other base station, the controller may establish the allocation of the carriers of the set of carriers between the base station and the other base station.

Still further, in some examples, the controller may carry out one or more of these functions in response to the controller detecting a threshold extent of change in the base station's backhaul capacity. For instance, the controller may monitor the backhaul capacity of the base station over time. And in response to the controller determining that an extent of change in backhaul capacity between a current backhaul capacity and a most recent backhaul capacity exceeds a predetermined threshold, the controller may establish the allocation of the carriers of the set of carriers between the base station and the other base station.

Figure 5:
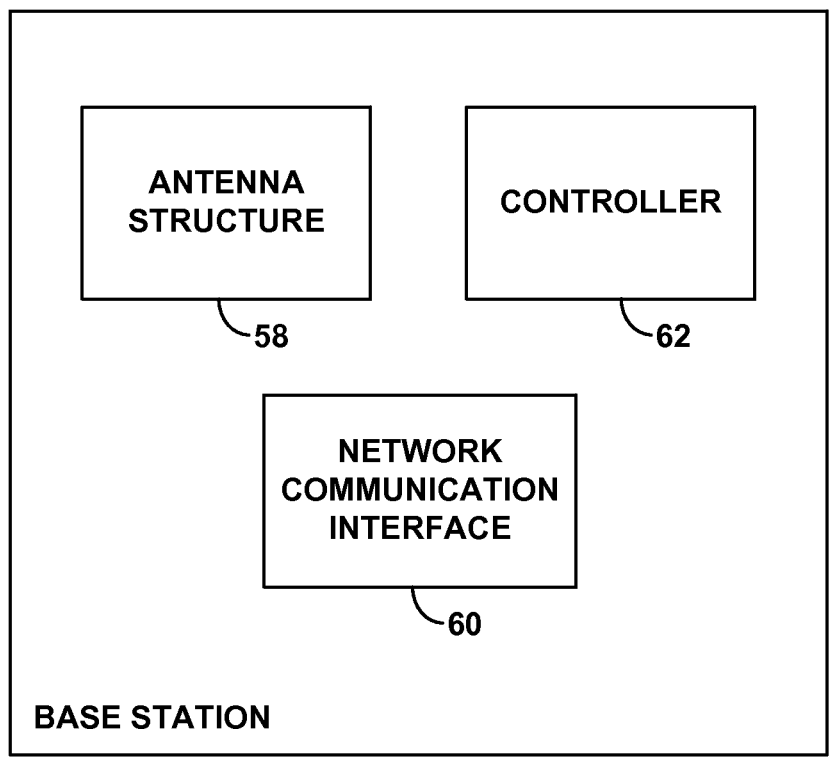
FIG. 5 is a simplified block diagram of an example base station that could carry out features of this disclosure.

Finally, FIG. 5 is a simplified block diagram of an example base station such as base station 12, showing some of the components of such a base station that could be provided to facilitate implementation of functions such as those described above. As shown in FIG. 5, the example base station includes an antenna structure 58 that radiates to define a coverage area for serving UEs. Further, the example, base station includes a network communication interface 60, and a controller 62 that allocates carriers of a set of carriers between the base station and another base station, such as the base station 14.

Network communication interface 60 may comprise a wired or wireless interface for communicating with the other base station. By way of example, the network communication interface may comprise an X2 interface through which the base station is configured to receive backhaul capacity reports from the other base station. In addition, the base station may provide instructions to the other base station using the network communication interface. For instance, as discussed above, the base station may provide instructions for operating one or more carriers of the set of carriers.

Controller 62 may then include at least one processing unit, data storage, and program instructions stored in the data storage and executable by the at least one processing unit to carry out various functions. For example, the functions may include determining a backhaul capacity of the base station. Further, the functions may include establishing an allocation of the carriers of the set of carriers between the base station and the other base station based at least on a comparison between the determined backhaul capacity and a backhaul capacity reported by the other base station. Further, the functions may include causing the base station to operate one or more particular carriers in accordance with the established allocation of the carriers of the set of carriers. And the functions may include providing to the other base station instructions for operating on one or more other carriers of the set of carriers in accordance with the established allocation of the carriers of the set of carriers.

Exemplary embodiments of the present invention have been described above. Those skilled in the art will understand, however, that changes and modifications may be made to these embodiments without departing from the true scope and spirit of the invention, which is defined by the claims.

What is claimed is:

1. A method operable in a radio access network (RAN) having a first base station, at least one second base station, wherein the first base station and the at least one second base station provide overlapping coverage, wherein the first base station communicates with a backhaul network entity of a core network over a first backhaul link, and wherein the at least one second base station communicates with the backhaul network entity over a second backhaul link that is different from the first backhaul link, the method comprising:

- determining a first backhaul capacity of the first backhaul link;
- determining a second backhaul capacity of the second backhaul link;
- establishing, using at least one processing unit, an allocation of carriers of a set of carriers between the first base station and the at least one second based station based at least on a comparison between the determined first backhaul capacity and the determined second backhaul capacity;
- causing the first base station to operate on one or more particular carriers of the set of carriers in accordance with the established allocation of the carriers of the set of carriers; and
- causing the at least one second base station to operate on one or more other carriers of the set of carriers in accordance with the established allocation of the carriers of the set of carriers.

2. The method of claim 1, wherein the first base station comprises a macrocell, and wherein the at least one second base station comprises at least one femtocell.

3. The method of claim 2, wherein the at least one femtocell comprises multiple femtocells, and wherein the second backhaul capacity is a representative per-femtocell backhaul capacity.

4. The method of claim 1, wherein the first backhaul capacity and the second backhaul capacity each comprise a statistical measure of possible data rate for communication with the backhaul network entity over the first backhaul link and the second backhaul link, respectively.

5. The method of claim 1, wherein establishing the allocation of the carriers of the set of carriers between the first base station and the at least one second base station based at least on the comparison between the determined first backhaul capacity and the determined second backhaul capacity comprises:

- determining a backhaul-capacity ratio of the determined first backhaul capacity to the determined second backhaul capacity, and
- using the determined backhaul-capacity ratio as a basis to allocate the carriers of the set of carriers between the first base station and the at least one second base station, such that a ratio of a number of carriers allocated to the first base station to a number of carriers allocated to the at least one second base station is proportional to the backhaul-capacity ratio.

6. The method of claim 1, wherein the set of carriers comprises at least three carriers, and wherein establishing the allocation of the carriers of the set of carriers between the first base station and the at least one second based station comprises:

- allocating at least two carriers of the set of carriers to either the first base station or the at least one second base station, and
- allocating at least one other carrier of the set of carriers to the other of the first base station and the at least one second base station.

7. The method of claim 1, carried out by a controller that is separate from both the first base station and the at least one second base station, and wherein:

- causing the first base station to operate on one or more particular carriers of the set of carriers in accordance with the established allocation of the carriers of the set of carriers comprises providing a first message to the first base station that instructs the first base station to operate on the one or more particular carriers of the set of carriers, and
- causing the at least one second base station to operate on one or more other carriers of the set of carriers in accordance with the established allocation of the carriers of the set of carriers comprises providing a second message to the at least one second base station that instructs the at least one second base station to operate on the one or more other carriers of the set of carriers.

8. The method of claim 1, wherein the first base station is configured to operate on a first dedicated carrier and the second base station is configured to operate on a second dedicated carrier, and wherein the set of carriers comprise multiple carriers for carrier-aggregating with the first dedicated carrier, carrier aggregating with the second dedicated carrier, or both.

9. The method of claim 1, carried out by the first base station.

10. The method of claim 9, wherein determining the first backhaul capacity comprises measuring a data transfer rate for user data that is received by the first base station from the backhaul network entity for delivery to a user equipment device (UE) being served by the first base station.

11. The method of claim 9, wherein determining the first backhaul capacity comprises:

- the first base station sending multiple test data packets of varying size to the backhaul network entity as part of a data-rate test, and
- the first base station determining, as the first backhaul capacity, a maximum backhaul data rate between the first base station and the backhaul network entity during the data-rate test.

12. The method of claim 9, wherein determining the second backhaul capacity comprises the first base station receiving from the at least one second base station a report specifying the second backhaul capacity.

13. The method of claim 1:

- wherein the at least one second base station comprises a master base station and one or more slave base stations that each report their respective backhaul capacity to the master base station, and
- wherein the method is carried out by the master base station.

14. A base station configured to communicate with a backhaul network entity of a core network over a first backhaul link, the base station comprising:

- an antenna structure that radiates to define a coverage area for serving user equipment devices (UEs);
- a network communication interface through which the base station is configured to receive backhaul capacity reports from another base station, wherein the base station and the other base station provide overlapping coverage, and wherein the other base station is configured to communicate with the backhaul network entity over a second backhaul link that is different from the first backhaul link; and
- a controller arranged to allocate carriers of a set of carriers between the base station and the other base station, wherein the controller comprises at least one processing unit, data storage, and program instructions stored in the data storage and executable by the at least one processing unit to carry out functions comprising:

(a) determining a backhaul capacity of the first backhaul link, (b) establishing an allocation of the carriers of the set of carriers between the base station and the other base station based at least on a comparison between the determined backhaul capacity and a backhaul capacity of the second backhaul link reported by the other base station, (c) causing the base station to operate on one or more particular carriers of the set of carriers in accordance with the established allocation of the carriers of the set of carriers, and (d) providing to the other base station an instruction for operating on one or more other carriers of the set of carriers in accordance with the established allocation of the carriers of the set of carriers.

15. The base station of claim 14:
wherein the set of carriers comprises at least three carriers, and
wherein either or each of (i) the one or more particular carriers of the set of carriers and (ii) the one or more other carriers of the set of carriers comprises two or more carriers.

16. The base station of claim 14, wherein the base station comprises a macrocell, and wherein the other base station comprises a femtocell.

17. The base station of claim 16, wherein the backhaul capacity reported by the other base station comprises a statistical measure that is indicative of a per-femtocell backhaul capacity for multiple femtocells operating in the defined coverage area.

18. The base station of claim 14:
wherein the base station is configured to receive carrier-update messages from the other base station through the network communication interface, and
wherein the controller is arranged to: establish the allocation of the carriers of the set of carriers between the base station and the other base station in response to receiving a carrier-update message from the other base station.

19. The base station of claim 14:
wherein the functions further comprise monitoring the backhaul capacity of the first backhaul link over time, and
wherein the controller is arranged to: establish the allocation of the carriers of the set of carriers between the base station and the other base station in response to determining that an extent of change in backhaul capacity between a current backhaul capacity of the first backhaul link and a most recent backhaul capacity of the first backhaul link exceeds a predetermined threshold.

20. A non-transitory computer-readable medium having stored thereon instructions executable by at least one processing unit to carry out functions comprising:
determining a first backhaul capacity of a first backhaul link, wherein a first base station communicates with a backhaul network entity of a core network over the first backhaul link;
determining a second backhaul capacity of a second backhaul link that is different from the first backhaul link, wherein at least one second base station communicates with the backhaul network entity over the second backhaul link, and wherein the first base station and the at least one second base station provide overlapping coverage;
establishing an allocation of carriers of a set of carriers between the first base station and the at least one second based station based at least on a comparison between the determined first backhaul capacity and the determined second backhaul capacity;
causing the first base station to operate on one or more particular carriers of the set of carriers in accordance with the established allocation of the carriers of the set of carriers; and
causing the at least one second base station to operate on one or more other carriers of the set of carriers in accordance with the established allocation of the carriers of the set of carriers.

\* \* \* \* \*